United States P

Haugh

3,658,526

Apr. 25, 1972

[54] HOLOGRAM RECORDING IN PHOTOPOLYMERIZABLE LAYERS

[72] Inventor: Eugene Frederick Haugh, Wilmington, Del.

[73] Assignee: E. I. du Pont de Nemours and Company, Wilmington, Del.

[22] Filed: Aug. 25, 1969

[21] Appl. No.: 852,927

[52] U.S. Cl.....................................96/27, 96/35, 350/3.5
[51] Int. Cl..............................................................G03c 5/04
[58] Field of Search...............................350/3.5; 96/27, 35.1

[56] References Cited

UNITED STATES PATENTS 3,129,098   4/1964   Kitson......................................96/35.1
3,410,203   11/1968  Fischbeck..................................350/3.5

*Primary Examiner*—Norman G. Torchin
*Assistant Examiner*—Won H. Louie, Jr.
*Attorney*—James T. Corle

[57] ABSTRACT

High-resolution holograms, stable to exposure to actinic light, are made from photopolymerizable materials by a single-step process wherein a permanent image is obtained by a single imagewise exposure of a photopolymerizable layer to actinic radiation bearing holographic information. Diffraction gratings and copies of holograms can be made rapidly in accordance with the invention.

18 Claims, No Drawings

HOLOGRAM RECORDING IN PHOTOPOLYMERIZABLE LAYERS

BACKGROUND OF THE INVENTION

1. Field of the Invention

This invention relates to the art of holography, and in particular to hologram masters and copies made from photopolymerizable materials and to processes for making them.

2. Description of the Prior Art:

Holography is a form of optical information storage wherein no lens or other image-forming device is used and no image in the usual sense is formed. The general principles are described in a number of references, e.g., "Photography by Laser" by E. N. Leith and J. Upatnieks in SCIENTIFIC AMERICAN, 212, No. 6, 24–35 (June, 1965). In brief, the object to be photographed is illuminated with coherent light, e.g., from a laser, and a photographic plate is positioned so as to receive light reflected from the object. Each point on the object reflects light to the entire photographic plate, and each point on the plate receives light from the entire object. At the same time, a portion of the coherent light is beamed by a mirror directly to the plate, bypassing the object. What is recorded on the photographic plate is the interference pattern that results from the interaction of the reference beam and the reflected light impinging on the plate from the object. When the developed photographic plate is subsequently illuminated and observed appropriately, the light from the illuminating source is diffracted by the hologram to reproduce the wave-front that originally reached the plate from the object, so that the hologram resembles a window through which the virtual image of the object is observed in full three-dimensional form, complete with parallax.

It will be apparent that a hologram is somewhat similar to a ruled grating, with the significant distinction of the non-uniform spacing of the lines of the interference pattern in the hologram as compared with the precise uniformity of spacing in a grating. It follows that the production of high-quality holograms, capable of reproducing fine details, requires that the material used be able to record accurately a large number of lines per linear unit. This property, somewhat analogous to but not the same as resolution, is referred to as spatial frequency and is commonly expressed in units of lines per millimeter (l/mm). It is generally recognized that a good holographic recording material should be capable of recording spatial frequencies in excess of 1,000 l/mm. Additional factors affecting image quality are brightness of image and absence of light scattering. A good holographic recording material should transmit a high percentage of light and be substantially free of scattering centers after processing.

The present state of the art has other limitations in the practical making of original holograms. First, only lasers give coherent light of sufficiently high intensity to be useful. Of the available lasers, the He-Ne laser has gained widest acceptance, with the consequence that red-sensitive materials have generally been used to make originals. Second, relatively short exposure times, hence, relatively high-speed photosensitive materials, must be used, even when massive shock-mounted bases are employed to eliminate vibrations from the apparatus. This requirement follows from the fact that displacement of the object, the mirror, or the photographic plate by as little as one-half wavelength can cause partial or complete destruction of a hologram because of the resulting change in the phase relation between the reference beam and the light from the object.

The numerous requirements have been met and hologram originals of excellent quality have been made by the use of silver halide photosensitive materials of the kind ordinarily used for spectrographic and astronomical photography, usually super-fine-grain emulsions coated on glass plates to enhance the stability of the image. While relatively slow, these materials are sensitive into the red, hence, are suitable for use with He-Ne lasers, and they will record spatial frequencies in excess of 3,000 l/mm. Because of their superior quality, they are expensive.

When there is a need for a number of copies of a given hologram, it is costly to produce each of them as an original, because of the strict requirements just discussed. However, despite the absence of a visible image in the usual sense, it is possible to regard a hologram, made in the manner described, as a photographic negative and to make copies of it by essentially conventional contact printing techniques. A material suitable for making copies must, of course, be capable of recording the spatial frequencies present in the original (i.e., in excess of 1,000 l/mm), must have good light transmission, and must be substantially free of light-scattering centers. However, the copy material need not be restricted to red-sensitivity nor to relatively high speed, because light sources less coherent than lasers can be used to make copies and because the effect of vibrations can be eliminated by holding the original and the copy material in intimate contact, e.g., in a conventional vacuum printing frame. Aside from adequate spatial frequency capability, good transmission, and freedom from scattering, the only requirement of the copy material is that there be sufficient distinction between exposed and unexposed areas to result in diffraction. Satisfactory copies are commonly made with silver halide materials of lower quality than that required for originals.

Although silver halide materials have been suitable from a technical standpoint for making both hologram originals and hologram copies, they have the disadvantages that they are expensive, as to both the cost of original materials and the cost of developing and fixing after exposure, and they do not permit immediate access to the finished product. Various attempts have been made to use other photosensitive materials for hologram originals or copies or both, in an effort to overcome these disadvantages of silver halide materials. For example, dichromated gelatin and conventional photoresist materials have been tried, but, although less expensive than silver halide materials, they also require wet processing steps to develop and fix the image and consequently involve delayed availability. Relatively inexpensive copies can be made by a diazo film process, but the exposure times are relatively long, the spatial frequency capability is low, and the image intensity is low as compared with the original. Electrostatic imaging processes offer relatively high speed and quick access, but are probably restricted to low spatial frequencies because of the size of toner particles.

These deficiencies of the prior art are overcome by the present invention, which provides for the use of certain photopolymerizable materials as photosensitive media in the making of hologram originals and copies. The photopolymerizable materials are less expensive than silver halide materials and they require no processing after exposure to provide a permanent image. That is, the image produced by the single step of exposure is not adversely affected by subsequent exposure, even to light of the same wave-length as that used in making the original exposure. Because of this feature of the invention, immediate access to the finished product is possible. In addition, the invention allows flexibility in the selection of radiation sources and exposure periods to complement the particular photopolymerizable layer used, and it provides excellent reproduction of spatial frequencies at least up to 1,000–1,200 l/mm.

SUMMARY OF THE INVENTION

This invention in one of its aspects relates to an image-bearing layer of essentially uniform optical density containing an image stable to actinic radiation, said image-bearing layer being characterized by consisting of image and non-image areas that together constitute a holographic record in the form of organic compounds, and at least said imaged areas comprise a vinyl polymer.

In another of its aspects, the invention relates to a single-step process for forming a light-stable hologram, said process comprising exposing to modulated actinic radiation bearing holographic information a photopolymerizable layer that transmits actinic radiation, said layer comprising:

1. at least one addition-polymerizable, non-gaseous, ethylenically unsaturated monomeric compound having a boiling point above 100° C. at normal atmospheric pressure and being capable of forming a high polymer by free-radical-initiated, chain-propagating addition polymerization; and
2. a free-radical-generating polymerization initiator or system activatable by said actinic radiation.

In addition to components (1) and (2), the photopolymerizable layer can contain an organic polymeric binder, a plasticizer for the binder, a thermal polymerization inhibitor, and a chain transfer agent or polymerization accelerator, and other components.

DESCRIPTION OF THE PREFERRED EMBODIMENTS

In making the products and practicing the process of this invention, it is preferred to employ a photopolymerizable layer containing a polymeric binder, an addition-polymerizable monomer, a photoinitiator system, a chain transfer agent, and a plasticizer, each so selected and used in such proportions that the resulting layer will be solid below 40° C. Exposure of this layer to modulated actinic radiation bearing holographic information will result in photopolymerization with accompanying changes in various physical properties in the exposed areas. The final product, of course, is transparent to the radiation used for viewing or reconstruction. The exposure step should be carried out under conditions which overcome the polymerization-inhibiting effect of atmospheric oxygen. Appropriate mechanical means include exposure in a vacuum frame or through a cover sheet having relatively low permeability to oxygen, and flooding of the photopolymerizable layer with inert gas, e.g., nitrogen or $CO_2$, during the exposure period. Alternatively, special mechanical provisions can be omitted if a high-speed initiator system is used, i.e., one which provides a rate of polymerization of monomer that exceeds the rate of diffusion of atmospheric oxygen into the photopolymerizable layer. This can be accomplished by use of preferred initiator systems disclosed more fully hereinafter, notably those of French Pat. No. 1,481,819. It is a significant feature of this invention that, when the photosensitive layer is made from the preferred constituents, the single step of imagewise exposure results in a permanent hologram, i.e., in a holographic record which is not destroyed or adversely affected by subsequent non-imagewise exposure to actinic radiation even of the same wavelength as that used for the initial imagewise exposure. The single-step process of this invention provides immediate access to the copy and eliminates developing and fixing operations after exposure.

In one embodiment of the invention, by appropriate selection of the kind and proportion of binder, the preferred components outlined above may be mixed together in a suitable solvent and the resulting composition cast by conventional procedures to form, after evaporation of the solvent, a self-supporting photopolymerizable layer. Alternatively, the solution of components may be coated on a transparent base or substrate and the solvent then evaporated to leave a photopolymerizable layer. The binder may be omitted and the other components, with or without solvent, may be used in liquid form, e.g., in a cell or coated on a transparent substrate. It is generally preferred to use a binder and to employ a transparent base or substrate, but it is to be understood that the scope of the invention is not limited to that embodiment or to the other embodiments mentioned above solely by way of illustration.

When a binder is used, it is preferred to employ an organic polymeric material that is solid at 50° C., and it is preferred that the binder be compatible with the polymerizable monomer, the polymerization initiator system, and any other components that may be present. It may frequently be desirable, but it is not required, that the binder be thermoplastic. When a binder is used, it is preferred that it constitute from about 10 to about 90 parts by weight of the total photosensitive composition (exclusive of any base or substrate that may be employed) and that the polymerizable monomer likewise constitute from about 10 to about 90 parts by weight of the same total photosensitive composition. The binder may be of the same general type as the polymerizable monomer being used and may be soluble therein and plasticized thereby.

A wide variety of suitable binders, both thermoplastic and nonthermoplastic, is disclosed in Burg and Cohen, U.S. Pat. No. 3,060,023, e.g., cellulose ethers or esters; polyalkylene ethers; condensation polymers of glycols with dibasic acids; polymers and copolymers of vinyl esters; acrylic acids and esters; polyvinyl alcohol; cellulose; phenolic resins; and the like. Other binders, including a number of vinylidene polymers, are disclosed in Plambeck, U.S. Pat. Nos. 2,760,863 and 2,791,504. Still other useful binders are (a) the N-methoxymethyl polyhexamethylene adipamide mixtures of Saner, British Pat. No. 826,272; (b) the polyester, polyacetal or mixed polyesteracetal mixtures of Martin, U.S. Pat. No. 2,892,716; (c) the fusible polyvinyl alcohol derivatives of Martin, U.S. Pat. No. 2,902,365; (d) the fusible blends of selected organic-soluble, base-soluble cellulose derivatives of Martin and Barney, U.S. Pat. No. 2,927,022; (e) the polyvinyl acetal compositions having extralinear vinylidene groups of Martin, U.S. Pat. No. 2,902,710; (f) the linear polyamide compositions containing extralinear N-acrylyloxymethyl groups of Saner and Burg, U.S. Pat. No. 2,972,540; and (g) the 1,3-butadiene compositions of McGraw, U.S. Pat. No. 3,024,180.

In some instances, the polymerizable monomer may also serve as a plasticizer for the binder, when a binder is used. In other instances, it may be desirable to include a separate plasticizer component in the composition. The plasticizer can readily be selected from the large number of materials known in the art on the basis of its suitability for the particular binder material and its compatibility with the other components. In general, the plasticizer should be an inert, relatively non-volatile, liquid or semi-liquid material. Examples of suitable materials are: triacetin; triethylene glycol diacetate, dipropionate, or diisobutyrate; and bis-(acetamidopropoxy) ethane.

The practice of the instant invention is not limited to the use of any particular polymerizable monomer, it being required only that the monomer be ethylenically unsaturated and capable of addition polymerization. A large number of useful compounds is available, generally characterized by a plurality of terminal ethylenic groups. Among the suitable materials may be mentioned (a) various vinyl and vinylidene monomers, e.g., vinyl carboxylates, α-alkyl acrylates, α-substituted acrylic acids and esters thereof, vinyl esters, vinyl hydrocarbons, acrylic and α-substituted acrylic acid esters of the polymethylene glycols and ether alcohols, all as disclosed in Plambeck, U.S. Pat. Nos. 2,760,863 and 2,791,504; (b) the various compounds disclosed (col. 16, ll. 36 ff.) in Martin and Barney, U.S. Pat. No. 2,927,022, and especially those having a plurality of addition-polymerizable ethylenic linkages, particularly when present as terminal linkages, and more especially those wherein at least one and preferably most of such linkages are conjugated with a doubly bonded carbon, including carbon doubly bonded to carbon and to such heteroatoms as nitrogen, oxygen and sulfur; (c) esters of pentaerythritol compounds of the kind disclosed in Celeste and Bauer, U.S. Pat. No. 3,261,686; and (d) compounds of the kind described in Cohen and Schoenthaler, U.S. Pat. No. 3,380,831, e.g., the reaction products of trimethylolpropane, ethylene oxide, and acrylic or methacrylic acid.

The free-radical-generating polymerization initiator system may consist of a single compound or may comprise several components which act together to generate free radicals on exposure to actinic radiation. In a given instance, the photoinitiator system will be chosen from among the many useful compounds known in the art on the basis of its solubility in the composition, its compatibility with the other components, and its effectiveness with the specific monomer. Concentration of the initiator may be 0.001 to 10 parts per part (by weight) of component (1) and will be governed by such factors as the thickness of the coating, the exposure conditions, and the photographic speed, i.e., rate of polymerization. A number of useful photoinitiators, although some of them may be thermally active at temperatures as low as 85° C., are described in Plambeck, U.S. Pat. No. 2,760,863, and include vicinal ketaldonyl compounds, e.g., diacetyl, benzil; α-ketaldonyl alcohols, e.g., benzoin, pivaloin; acyloin ethers, e.g., benzoin methyl and ethyl ethers; α-hydrocarbon-substituted aromatic acyloins, e.g., α-methylbenzoin, α-allylbenzoin, α-phenylbenzoin. A more preferred class of photoinitiators, thermally inactive at and below 185° C., are the substituted or unsubstituted polynuclear quinones having two intracyclic carbonyl groups attached to intracyclic carbon atoms in a conjugated carbocyclic ring system, a number of which are disclosed at col. 2, 11. 8 ff. of Notley, U.S. Pat. No. 2,951,758. Still more preferred, particularly because they impart high speed to the photosensitive composition, are the initiator systems described in French Pat. No. 1,481,819 to Thommes, Walker and Chambers, and especially the multi-component systems comprising a 2,4,5-triphenylimidazolyl dimer, e.g., lophine dimer; a free-radical-producing agent, e.g., a leuco dye; and a chain transfer agent, e.g., N-phenylglycine. Still other preferred photoinitiator systems are those of the lophine dimer/Michler's ketone type disclosed in the assignee's copending application of Chang and Fan, Ser. No. 731,733, filed May 24, 1968 now U.S. Pat. No. 3,549,367, issued Dec. 22, 1970.

Many of the low molecular weight polymerizable components discussed previously, including both the mono- and polyethylenically unsaturated compounds, will normally contain, as obtained commercially, minor amounts (about 50–100 parts per million by weight) of polymerization inhibitors to prevent spontaneous thermally induced polymerization before desired. The presence of these inhibitors, which are usually of the antioxidant type, in such amounts causes no undesirable results in the practice of this invention, either as to speed or as to quality of polymerization. In fact, larger quantities of such inhibitors, e.g., of the order of 200–500 parts per million, can easily be tolerated and may be advantageous in tending to reduce unwanted polymerization in non-exposed areas. Suitable thermal polymerization inhibitors include p-methoxyphenol, hydroquinone, alkyl- and aryl-substituted quinones and hydroquinones, tert-butyl catechol, pyrogallol, copper resinate, naphthylamines, β-naphthol, cuprous chloride, 2,6-di-tert-butyl p-cresol, phenothiazine, pyridine, nitrobenzene and dinitrobenzene, p-toluquinone, chloranil, and thiazine dyes, e.g., Thionine Blue G (C.I. 52025), Methylene Blue B (C.I. 52015), and Toluidine Blue O (C.I. 52040).

If desired, the photosensitive compositions used in this invention may also include chain transfer agents or polymerization accelerators, such as one or more of the agents disclosed in Barney et al., U.S. Pat. No. 3,046,127, in the amounts given in that patent. Among the useful chain transfer agents are: polyethylene glycols having a molecular weight of from about 500 to about 20,000; the esters and ethers of such polyethylene glycols; alkyl mercaptans of four to 16 carbon atoms; and the thioureas and the N-alkenyl and N-alkyl derivatives thereof.

As previously indicated, the several components of the photopolymerizable compositions useful in this invention will ordinarily be mixed together in a solvent for all of the components. The particular solvent is not critical. Suitable solvents are 2-propanone, 2-butanone, 3-pentanone, 1,2-dichloroethane, methyl acetate, dichlormethane, trichloromethane, and ethyl acetate. Mixtures of two or more such solvents can be used.

For convenience in handling, the photopolymerizable composition is preferably coated on a base support, which should be transparent, i.e., should have good light transmission and be free of light-scattering centers. Glass plates may be used for this purpose. Other suitable materials are films composed of high polymers such as polyamides, e.g., polyhexamethylene sebacamide, polyhexamethylene adipamide; polyolefins, e.g., polyethylene, polypropylene; polyesters, e.g., polyethylene terephthalate, polyethylene terephthalate/isophthalate; vinyl polymers, e.g., vinyl acetals, vinylidene chloride/vinyl chloride copolymers, polystyrene, polyacrylonitrile; and cellulosics, e.g., cellulose acetate, cellulose acetate/butyrate, cellophane. A particularly preferred support material is polyethylene terephthalate film of the kind described in Alles et al., U.S. Pat. No. 2,627,088, and Alles, U.S. Pat. No. 2,779,684, with or without the surface coating described in the former patent. The support used, of whatever type, may also have in or on its surface and beneath the photopolymerizable stratum an antihalation layer or other substrate needed to facilitate anchorage of the photopolymerizable stratum to the base. The manner of coating the photosensitive composition on a base or of casting it to form a self-supporting film is not critical; these operations are readily performed by procedures well known to those skilled in the art.

Even after evaporation of the solvent, many of the photosensitive coatings or self-supporting films made from the various components outlined above are somewhat soft, sticky, or tacky. To facilitate storage and handling, it may frequently be desirable to apply a cover layer, which may be either an additional coating or a previously cast film, e.g., dimensionally stable polyethylene terephthalate film. Alternatively, any of a number of readily soluble polymeric materials, e.g., polyvinyl alcohol, may be coated in solution over the photopolymerizable layer to leave, upon removal of solvent, a hard, dry, non-tacky surface. In a given instance, the protective coating may be left in place during exposure or not, depending on such factors as (a) the degree of tackiness of the photopolymerizable layer, and (b) the sensitivity of the photopolymerizable composition to the polymerization-inhibiting effect of oxygen. If it is to be left in place, the material selected should have good clarity and its thickness should be held to a minimum in order to avoid disturbance of the superior optical properties that are necessary to the high spatial frequency capability required for good quality holograms. After the photosensitive layer has been hardened by photopolymerization, it will generally be unnecessary to retain the cover layer, although it may be left in place, if desired.

In carrying out the process of this invention, a photopolymerizable layer selected from any of the kinds described hereinbefore is given imagewise exposure to modulated actinic radiation bearing holographic information. In the case of making original holograms, the modulated actinic radiation bearing holographic information consists of the interference pattern resulting from the interaction of the reference beam and the light reflected from the object being "photographed." In the case of making hologram copies, the modulated actinic radiation bearing holographic information consists of the actinic radiation transmitted from a source to the photopolymerizable layer through a previously made hologram master, i.e., an image-bearing layer transparent to the actinic radiation and bearing a holographic record. In either case, the actinic radiation employed will be chosen to correspond to the sensitivity of the photoinitiator in the photopolymerizable layer, or, conversely, the photoinitiator will be chosen to correspond to the available source of actinic radiation. The particularly preferred initiators discussed hereinbefore exhibit their maximum sensitivity in the ultraviolet range, with lesser but still useful sensitivity into the blue. When they are employed in the photopolymerizable composition, the radiation source should, therefore, furnish an effective amount of this radiation. It is to be understood, however, that photoinitiators with maximum sensitivity at other wavelengths and corresponding radiation sources may also be used.

As discussed hereinbefore, for the making of original holograms it is essential to use highly coherent light of high intensity. This is no less true for making original holograms in photopolymerizable materials than it is for making the prior art original holograms in silver halide materials. In the present state of the art, only lasers provide light of sufficient coherency and intensity. Therefore, in making original holograms in photopolymerizable materials, it will be necessary to use a laser with output in the wavelength to which the photoinitiator in the photopolymerizable composition is sensitive. For example, when using the preferred photoinitiators hereinbefore defined, with maximum sensitivity in the ultraviolet and useable sensitivity into the blue, a suitable source of actinic radiation is a krypton laser with high blue output.

For the making of hologram copies on photopolymerizable materials, the quality of the copies will be enhanced if the source of the actinic radiation at least approximates a point source, although it is not required that the light be strictly coherent. However, the use of a source that does not at least approximate a point source can cause a significant decrease in resolution. For the making of copies with the preferred compositions, useable sources include, among others, carbon arcs, mercury-vapor arcs, and quartz-iodide lamps. Tungsten lamps require longer exposures than some of the other sources. By way of example, mercury-vapor arcs can conveniently be used at a distance of 5–20 inches from the photopolymerizable layer in the making of copies. Exposure with visible light may also be accomplished by using a photoinitiator sensitive in the visible region of the spectrum, e.g., 9,10-phenanthrenequinone. In such cases, the radiation source should furnish an effective amount of visible radiation. Many of the radiation sources listed above furnish the required amount of visible light. The angle at which the incident light from the radiation source strikes the hologram master and, through it, the photopolymerizable layer is important. The best copies result when the light strikes at an angle which corresponds, after correction for difference in wavelength, to the angle of incidence of the reference beam in the making of the original hologram. The relationship is:

$$\frac{\sin \theta_c}{\sin \theta_m} = \frac{\lambda_c}{\lambda_m}$$

Where
$\theta_c$ = angle of incidence of copying light.
$\theta_m$ = angle of incidence of original reference beam.
$\lambda_c$ = wavelength of copying light.
$\lambda_m$ = wavelength of light used in making original.

It is to be understood, however, that copies can be made even when the copying light is not positioned in keeping with the foregoing relationship. Further, in many instances the original angle of the reference beam will be unknown to the individual making copies of a given hologram, although it may frequently be deduced, as will be recognized by those skilled in the art, if the wavelength of the light used in making the original is known.

In making copies, the hologram original and the photopolymerizable element should be in firm contact during exposure. This can conveniently be attained in a vacuum printing frame. With the non-coherent radiation sources described above, separation of the two surfaces should be prevented. Separation of 0.001-inch can cause a decrease in resolution to less than 200 l/mm, and separation of 0.002 inch or more may cause a loss of holographic information. When the actinic radiation is highly coherent, as from a laser of wavelength appropriate to the photoinitiator present, separation of 0.04-inch and even 0.25-inch can be tolerated without significant loss of quality of the hologram copy.

In making either original holograms or copies, exposure times may vary from a fraction of a second to several minutes, depending on such factors as the particular polymerizable monomer chosen, the rate of the photoinitiator system's response to actinic radiation, the intensity of the radiation source and its distance from the photosensitive stratum, and the like. An additional significant factor when making copies is the density of the hologram original being copied. For example, in making hologram copies with some of the most preferred compositions containing high-speed photoinitiators, an adequate exposure may be 15 seconds or less to a mercury arc at a distance of 50 cm from the photosensitive layer, whereas exposures as long as 90 minutes or more may be required for other compositions containing less sensitive photoinitiators, all other conditions remaining the same. Similarly, in making hologram originals with the same preferred high-speed compositions and a krypton laser operating in the blue at relatively high intensity, exposures of 20 to 30 minutes may be required. Exposure time will, of course, vary inversely with the intensity of the light source, as is well understood in the photographic art. By way of illustration, with a given hologram master, the preferred photosensitive composition defined in Example I hereinafter, and a mercury arc having a peak output at 365 nm, useful hologram copies were made at such wide extremes of exposure as (a) 0.15 second at incident radiation intensity of 75 mW/cm$^2$ and (b) 40 minutes at incident radiation intensity of 0.2 mW/cm$^2$.

It will further be recognized that, for every given set of conditions (particular photopolymerizable compositions, nature and placement of light source, and the like), there will be an optimum exposure time, which can be determined by trial in the same manner that exposure times for conventional silver halide films are determined, or by calculation if the properties of the photopolymerizable film, such as "speed" at the wavelength of exposure, are known. As with other photosensitive materials the film may be underexposed (resulting in no image or a poor image) or overexposed. Overexposure may result in an initial holographic image which may be partially or totally obscured by subsequent non-imagewise exposure. Thus, it is important to determine for each set of conditions the optimum exposure time. A surprising aspect of the present invention is that in some instances intermittent exposure may be better than continuous exposure, especially if the optimum continuous exposure time is less than 30 seconds. The intermittent exposure will usually be short (1 to 5 seconds), interrupted by 15–60 second waiting periods. The length of the individual partial exposure periods need not be uniform.

Particularly surprising is the fact that a permanent image results from the single step of imagewise exposure, i.e., without the developing and fixing operations that are commonly required to attain stability of image in the prior art methods of making holograms based on either silver halide materials or other photosensitive materials. The holographic record (either an original or a copy) formed in the photopolymerizable layer by imagewise exposure is not destroyed or adversely affected by subsequent non-imagewise exposure, even to actinic radiation of the same wavelength as that used in making the initial imagewise exposure. In fact, in many instances it has been observed that such subsequent exposure has enhanced the clarity and/or intensity of the holograms. It will be apparent that the elimination of such post-exposure steps as developing and fixing affords the highly desirable advantage of immediate access to the completed hologram. This feature is useful for original holograms, and is of particular utility in making copies since it permits a high-speed, mass-production operation for making multiple copies at low cost per copy.

Normally, photopolymerization processes are inhibited by oxygen and substantial effort is expended, as in Heiart U.S. Pat. No. 3,060,026 for example, to exclude oxygen from the photopolymerizable material both before and during exposure. Only after imagewise exposure has been completed and after polymerization of the exposed areas has occurred, is oxygen admitted, with the intention that its presence will prevent polymerization of monomer in the unexposed areas. Customarily, these previously known photopolymerization processes include steps for developing and fixing the image through removal of unpolymerized material from the unexposed areas by solvent wash-out, thermal transfer, or other means. In the practice of the present invention, it will often be found desirable, but not always necessary, to exclude oxygen during exposure. If a cover sheet or coating is used, it may be absent during exposure with no adverse effect on image quality when the composition incorporates a high-speed photoinitiator system which stimulates a rate of polymerization of monomer that exceeds the rate of diffusion of atmospheric oxygen into the photosensitive layer. In particular, if such a cover sheet or coating is used, it is not necessary that it be removed immediately after imagewise exposure in order to fix the image. As already discussed, subsequent non-imagewise exposure will have no harmful effect on the image and may in fact improve its quality, and this result will pertain with or without the presence of oxygen.

When the photopolymerizable layer is exposed imagewise to actinic radiation bearing holographic information as already defined, the addition-polymerizable, non-gaseous, ethylenically-unsaturated monomeric compound in the photosensitive composition is caused to polymerize to form a vinyl polymer in the exposed (imaged) areas but not in the unexposed (non-imaged) areas. It will be understood that, after exposure and polymerization, both the imaged and non-imaged areas will also still contain any other components that were initially present in the photosensitive composition, such as preformed organic polymeric binders (including preformed vinyl polymers as distinct from the exposure-produced vinyl polymer), plasticizers, solvents, and the like. It is noteworthy that, despite the formation of polymer in the imaged areas, inspection with a microdensitometer reveals no significant variations in optical density across the image-bearing layer that can be correlated with the areas that do and do not contain holographic information. The layer in which the holographic information has been recorded (either as an original or as a copy of a previously made hologram) by the step of exposure can, without further processing of any kind, be used with appropriate lighting, as understood by those familiar with the holographic art, to reconstruct an image of the object originally "photographed."

When the imaged layer is given a subsequent non-imagewise exposure to polymerization-inducing radiation, it will be true, of course, that the monomer remaining in the areas that were not exposed in the first, imagewise exposure will also polymerize, with the result that the image-bearing layer will then contain vinyl polymer in both imaged and non-imaged areas, together with other components as already discussed. Such a second, non-imagewise exposure may be given purposely or it may be incidental to normal use of the layer, but in any event it is not required, although it may be found in some instances to improve the quality of the hologram. What is indeed surprising about the present invention is that no care need be taken to prevent such a second exposure. This is the reverse of the requirement of other light-sensitive systems, wherein the useful image produced by initial imagewise exposure will be destroyed unless the unused photosensitive portion of the system is removed before subsequent non-imagewise exposure. Thus, for example, in silver halide systems, the exposed silver halide must be reduced and the unused silver halide must be removed from the unexposed area by the processes of developing and fixing. Similarly, in other photopolymer applications, the unexposed areas containing monomer must be rendered unable to obscure the exposed and polymerized areas by a stabilizing operation such as solvent wash-out, thermal transfer, differential adhesion transfer, and the like. No such requirement exists in the present invention. A stable, useful holographic record will be retained in the image-bearing layer even if all the monomer in both the imaged and non-imaged areas is eventually converted to polymer, provided, of course, that the initial exposure is an imagewise exposure.

The invention will be further illustrated by, but is not to be considered limited to, the following examples, wherein all parts and percentages are by weight unless otherwise specified. Examples I-XXXV are all concerned with making hologram copies in photopolymerizable materials from silver halide original holograms having spatial frequencies of from about 250 to about 1,750 l/mm, with the angle of the incident light adjusted in each case to approximate the angle, corrected for wavelength as previously indicated, of the reference beam used in making the original hologram.

EXAMPLE I

This Example illustrates a preferred composition using a lophine dimer/leuco dye initiator system. A thermoplastic photopolymerizable composition was made up as follows:

| | |
|---|---|
| Cellulose acetate butyrate (ca. 17% butyryl, ca. 29.5% acetyl, and ca. 1.5% hydroxyl; viscosity of 115 to 118 poises as determined by ASTM Method D-1343-54T in solution described as Formula A, ASTM Method D-871-54T) | 5.2 g. |
| Triethyleneglycol diacrylate | 5.8 g. |
| 2-o-Chlorophenyl-4,5-di(m-methoxyphenyl)-imidazolyl dimer | 0.6 g. |
| (3,4-Dimethoxyphenyl)-bis(2-methyl-4-diethylaminophenyl) methane | 0.3 g. |
| N-phenylglycine | 0.02 g. |
| Ethylene bis(2-oxyethyl acetate) | 0.2 ml. |
| Solvent (10 weight percent 1,2-dichloroethane, 90 weight percent dichloromethane) to make a total of | 80 g. |

The photopolymerizable solution was coated on a clear film support of polyethylene terephthalate having a thickness of 0.004 inch and bearing a subcoat of a copolymer of vinylidene chloride/methyl acrylate/itaconic acid as disclosed in Alles et al., U.S. Pat. No. 2,627,088. The coating was air-dried to give a coating weight of approximately 5mg./cm². For convenience in handling, a sheet of commercially available polyethylene terephthalate film having a thickness of 0.00025 inch was applied over the tacky coating surface.

The prepared photosensitive film was then placed in a vacuum printing frame with the 0.00025-inch polyethylene terephthalate film in contact with the emulsion side of a hologram master, and the assembly of hologram master and photosensitive film was placed under vacuum in the printing frame to insure intimate contact. Exposure for 15 seconds to a 200-watt high-pressure mercury arc at a distance of 50 cm. produced a hologram copy which could be viewed in the same manner as the original. No processing after the described exposure was necessary. The hologram copy was stable to normal room illumination.

EXAMPLES II-III

These Examples illustrate other preferred compositions based on lophine dimer/leuco dye initiator systems and made up according to Table 1. Each of the compositions was separately coated on the polyethylene terephthalate film support of Example I, air-dried to the approximate coating weight of Example I, and covered with the 0.00025-inch polyethylene terephthalate film of Example I. When exposed to a hologram master as described in Example I, each of the photosensitive films of Examples II and III gave a good hologram copy that required no further processing and was stable to normal room illumination.

TABLE 1

| Component | Example II | III |
|---|---|---|
| Cellulose acetate butyrate of Ex. I | 2.6 g. | 2.6 g. |
| Triethyleneglycol diacrylate | 2.6 ml. | 2.6 ml. |
| 2-o-Chlorophenyl-4,5,-diphenyl-imidazoyl dimer | 0.4 g. | 0.4 g. |
| Tris(4-N,N-diethylamino-2-methylphenyl) methane | 0.2 g. | 0.2 g. |
| Solution containing 10 mg. N-phenylglycine per ml. solvent | 1.0 ml. | 1.0 ml. |
| Ethylene bis(2-oxyethyl acetate) | 0.1 ml. | None |
| 2-propanone to a total of | 18.0 g. | 18.0 g. |

In the examples that follow, for convenience in tabulation the various components will be identified by code, as follows:

- A1 = cellulose acetate butyrate of example I
- A2 = polymethyl methacrylate (inherent viscosity = 0.20 for a solution of 0.25 g. polymer in 50 ml. chloroform as measured at 20° C. with a No. 50 Cannon-Fenske Viscometer)
- A3 = polymethyl methacrylate (inherent viscosity = 1.20, measured as described for A2)
- B1 = triethyleneglycol diacrylate
- B2 = pentaerythritol triacrylate
- B3 = trimethylolpropane triacrylate
- B4 = 1,4-butyleneglycol diacrylate
- B5 = polyethyleneglycol (M.W. 300) diacrylate
- B6 = triethyleneglycol dimethacrylate
- B7 = triacrylate of the reaction product of trimethylolpropane and ethylene oxide (M.W. 1000), made in the manner described in Cohen and Schoenthaler, U.S. Pat. No. 3,380,831.
- C = 2-o-chlorophenyl-4,5-diphenylimidazolyl dimer
- D = 2-o-chlorophenyl-4,5-di(m-methoxyphenyl)imidazolyl dimer
- E = tris(4-N,N-diethylamino-2-methylphenyl)methane
- F = solution containing 10 mg. N-phenylglycine per ml. solvent
- G = ethylene bis(2-oxyethyl acetate)
- H = 5,5-dimethyl-1,3-cyclohexanedione
- J = phenanthrenequinone (quantity indicated in tables in 2 ml. methanol)
- K = stannous chloride dihydrate
- L = triethanolamine
- M = solution containing 10 mg. methylene blue per ml. methanol
- N = 2-propanone
- P = 2-butanone
- R = 3-pentanone
- S = 1,2-dichloroethane
- T = methyl acetate
- U = dichloromethane
- V = trichloromethane
- W = ethyl acetate

EXAMPLES IV-XIII

These Examples illustrate other useful compositions wherein different initiator systems, different proportions of components, and different solvents were used, all as set forth in Table 2. For each of Examples IV-XIII, the composition was made up, coated, and exposed according to the procedure of Example I, except that in Examples IV, V and VI the substrate had a thickness of 0.007 inch rather than 0.004 inch. In each case a good hologram copy, stable to normal room illumination, was produced without further processing after the exposure step.

EXAMPLES XIV-XX

The general procedure of Example I was followed, with exceptions indicated below, for each of the compositions set forth in Table 3. These Examples, which show other useful means of carrying out the process of this invention, illustrate in particular the use of compositions of differing binder content. Example XIV shows a composition having no binder. In each case, the solvent was dichloromethane and the amount of solvent used was adjusted to give a solution viscosity approximately equivalent to that of the composition of Example II. In Examples XVI-XX, the 0.00025-inch polyethylene terephthalate cover film of Example I was omitted. In all cases, good hologram copies were produced.

TABLE 2

| Example | A1, g. | B1, ml. | C, g. | D, g. | E, g. | F, ml. | G, ml. | Solvent to make a total of 18.0 g. |
|---|---|---|---|---|---|---|---|---|
| IV | 2.6 | 2.6 | 0.1 | 0.1 | 0.1 | 1.0 | 0.1 | N |
| V | 2.6 | 2.6 | 0.1 | 0.1 | 0.1 | 1.0 | 0.1 | P |
| VI | 2.6 | 2.6 | 0.1 | 0.1 | 0.1 | 1.0 | 0.1 | R |
| VII | 2.6 | 2.6 | 0.15 | 0.15 | 0.15 | 1.0 | 0.1 | S |
| VIII | 2.6 | 2.6 | 0.3 | 0.3 | 0.3 | 1.0 | 0.1 | S |
| IX | 2.6 | 2.6 | 0.15 | 0.15 | 0.15 | 1.0 | 0.1 | T |

TABLE 2 — Continued

| Example | A1, g. | B1, ml. | C, g. | D, g. | E, g. | F, ml. | G, ml. | Solvent to make a total of 18.0 g. |
|---|---|---|---|---|---|---|---|---|
| X | 2.6 | 2.6 | 0.15 | 0.15 | 0.15 | 1.0 | 0.1 | U |
| XI | 2.6 | 2.6 | 0.3 | 0.3 | 0.3 | 1.0 | 0.1 | U |
| XII | 2.6 | 2.6 | 0.3 | 0.3 | 0.3 | 1.0 | 0.1 | V |
| XIII | 2.6 | 2.6 | 0.3 | 0.3 | 0.3 | 1.0 | 0.1 | W |

TABLE 3

| Example | A1, g. | B1, ml. | C, g. | D, g. | E, g. | F, ml. | G, ml. |
|---|---|---|---|---|---|---|---|
| XIV | None | 2.6 | 0.15 | 0.15 | 0.15 | 1.0 | 0.1 |
| XV | 1.3 | 2.6 | 0.15 | 0.15 | 0.15 | 1.0 | 0.1 |
| XVI | 5.2 | 2.6 | 0.15 | 0.15 | 0.15 | 1.0 | 0.1 |
| XVII | 13.0 | 2.6 | 0.15 | 0.15 | 0.15 | 1.0 | 0.1 |
| XVIII | 13.0 | 2.6 | 0.15 | 0.15 | 0.15 | 1.0 | 3.0 |
| XIX | 26.0 | 2.6 | 0.15 | 0.15 | 0.15 | 1.0 | 9.0 |
| XX | 104.0 | 2.6 | 0.15 | 0.15 | 0.15 | 1.0 | 36.0 |

EXAMPLE XXI

This Example shows the use of a photopolymerizable layer without a substrate or supporting film and without a protective cover sheet.

The composition of Example XVI was cast on a glass plate in the usual way to form, after evaporation of solvent, a self-supporting film having a thickness of approximately 0.005 inch. After it had been stripped from the glass plate, the film so formed was placed with a hologram master in a vacuum printing frame and exposed as in Example I to give a good, light-stable hologram copy. The 0.004-inch polyethylene terephthalate supporting film and the 0.00025-inch polyethylene terephthalate cover film of Example I were not used.

EXAMPLES XXII-XXV

The general procedure of Example I was followed, with exceptions as indicated, with the compositions of Table 4, which illustrate still other binder and initiator systems useful in the practice of this invention. In all cases, good light-stable hologram copies were produced. Specific notations are as follows:

Example XXII — A commercially available polyethylene terephthalate film with a thickness of 0.002 inch was used as both substrate and cover film, replacing the 0.004-inch substrate and the 0.00025-inch cover film of Example I. The 0.002-inch cover film was removed before exposure.

Example XXIII — the 0.002-inch film of Example XXII was used as a substrate in place of the 0.004-inch film of Example I; no cover film was used.

Example XXIV — the 0.004-inch substrate and the 0.00025-inch cover film of Example I were used.

Example XXV — the 0.002-inch substrate of Example XXII was used; in place of the 0.00025-inch cover film of Example I, a 6% aqueous solution of polyvinyl alcohol was applied and allowed to dry to produce a non-tacky finished photosensitive product.

TABLE 4

| Component | Example XXII | XXIII | XXIV | XXV |
|---|---|---|---|---|
| A2 | 2.4 g. | 2.4 g. | 2.2 g. | 2.4 g. |
| A3 | 0.8 g. | 1.0 g. | 0.8 g. | 0.8 g. |
| B1 | 1.9 ml. | 1.7 ml. | 1.5 ml. | 1.9 ml. |
| H | 0.3 g. | 0.3 g. | — | 0.3 g. |
| J | 0.165 g. | 0.165 g. | — | 0.165 g. |

| | | | | |
|---|---|---|---|---|
| K | 15 mg. | — | — | — |
| L | — | — | 0.2 ml. | — |
| M | — | — | 1.0 ml. | — |
| N to a total of | 15.0 g. | 15.0 g. | 15.0 g. | 20.5 g. |
| Exposure time, min. | 20 | 10 | 90 | 15 |

EXAMPLES XXVI-XXXI

The procedure of Example I was followed with a number of compositions illustrating the utility of other addition-polymerizable monomers in the practice of this invention. For each of the compositions, components A1, C, D, E, F and G were incorporated in the amounts indicated for Example VII, and each composition was made up to a total of 23.0 g with dichloromethane. Each composition contained 2.6 ml of monomer, as indicated in Table 5, which also shows the exposure time used. The 0.004-inch polyethylene terephthalate film of Example I was used as a substrate in all cases. No cover sheet was used for Examples XXVI and XXVII. The 0.00025-inch polyethylene terephthalate film of Example I was used as a cover sheet in Examples XXVIII-XXXI. In all cases, good, light-stable hologram copies were produced.

TABLE 5

| Example | Monomer Component | Exposure Time |
|---|---|---|
| XXVI | B2 | 30 sec. |
| XXVII | B3 | 30 sec. |
| XXVIII | B4 | 30 sec. |
| XXIX | B5 | 5 min. |
| XXX | B6 | 30 sec. |
| XXXI | B7 | 5 min. |

EXAMPLE XXXII

The following photosensitive composition:

| | |
|---|---|
| A1 | 2.6 g. |
| B1 | 2.6 ml. |
| C | 0.4 g. |
| E | 0.2 g. |
| F | 1.2 ml. |
| G | 0.1 ml. |
| Surface-active agent | 0.1 ml. |
| (60 parts condensation product of 20 mols of ethylene oxide and 1 mol of technical oleyl alcohol; 10 parts hexylene glycol; 30 parts water) | |
| N to a total of | 16.3 g. | was coated on 0.007-inch clear polyethylene terephthalate film of the kind described in Example I and covered with the 0.00025-inch polyethylene terephthalate film of Example I. By the procedure of Example I, the photopolymerizable layer was exposed imagewise through a hologram master for 15 seconds at a distance of 50 cm. from a 200-watt mercury arc. A holographic image was observed. Thereafter, non-imagewise exposure of the photosensitive layer directly to the mercury arc for 6 minutes did not destroy the holographic image. During this second, overall exposure the 0.00025-inch cover film was left in place, thus excluding atmospheric oxygen and creating a condition favorable to polymerization of the monomer remaining in the originally non-imaged, hence non-polymerized, areas. This Example illustrates that the single imagewise exposure serves to fix the image, even against a subsequent vigorous overall exposure that would normally be expected to destroy the image.

EXAMPLE XXXIII

The photosensitive film of Example I was placed in intimate contact with a hologram master in a vacuum printing frame as described in Example I and exposed imagewise for approximately 4 minutes to continuous-wave laser radiation having a wavelength of about 360 nanometers. A good, light-stable hologram copy was produced without further processing.

EXAMPLE XXXIV

Example XXXIII was repeated, except that the photosensitive film and the hologram master were not in intimate contact but were separated by a glass plate having a thickness of approximately 0.04 inch. A good hologram copy was produced.

EXAMPLE XXXV

Example XXXIV was repeated except that a glass plate having a thickness of about 0.25 inch was used. An acceptable hologram copy was produced. This and the preceding Example illustrate that the requirement of intimate contact between hologram master and copy material is less strict when highly coherent light is used.

EXAMPLE XXXVI

The composition of Example I was coated on the 0.004-inch-thick subcoated polyethylene terephthalate clear film support of Example I and, after evaporation of solvent, another sheet of the same polyethylene terephthalate film was overlaid as a cover sheet. The photosensitive film thus prepared was used to make a hologram of an object situated about 15 cm from the photosensitive film and illuminated by a krypton laser operating at about 50 mW output in the blue at 476.5 nanometers. Except for the use of the photopolymerizable layer in place of the prior art silver halide plate, conventional front-beam hologram techniques were employed, as will be understood by those familiar with the holographic art. The angle of incidence of the collimated reference beam to the photosensitive film was about 30°. A hologram of good intensity and clarity was produced after a 30-minute exposure to the reflected and reference laser light as described. During the exposure period, exposure was interrupted several times by blocking the light reflected by the object, and the incident reference beam was used to observe the hologram in the course of formation. Subsequently, the completed hologram was viewed by the same krypton laser in a manner that amounted to non-imagewise exposure of the photosensitive layer to the same radiation as used for imagewise exposure, but without loss of or adverse effect on the holographic record achieved by the initial imagewise exposure.

The same procedure was repeated with photosensitive films made from the compositions of Examples II, III, XXVII, XXVIII, XXX and XXXII, resulting in each case in a good, clear hologram that was stable, without further processing, to subsequent non-imagewise exposure to the same laser illumination. The compositions of Examples XXIX and XXXI were also operable for making original holograms by krypton laser, but were considered more suitable for use in copying operations, where it is easier to avoid the difficulties that may arise from vibrations during the longer exposure period required because of the slower speed of these compositions. By similar procedures, the composition of Example XXIV, with a red-sensitive photoinitiator, could be used to make an original hologram by He-Ne laser illumination of high red output. It will be understood that the making of original holograms is not restricted to the use of krypton or He-Ne lasers or to any specific one or several of the compositions described hereinbefore. For example, many of the compositions contain photoinitiators sensitive to ultra-violet light, and these compositions are suitable for making original holograms by lasers or other highly coherent light sources with strong ultra-violet output.

EXAMPLE XXXVII

Example XXXVI was repeated except that the collimated reference beam was directed to the back of the photosensitive film at an incident angle of 30° (the front of the photosensitive film being defined as the surface facing the object being photographed), according to the technique of back-beam holography as described, for example in J. Upatnieks, J.

Marks and R. Fedorowicz, "Color Holograms for White Light Reconstruction," *Applied Physics Letters*, Vol. 8, No. 11, 286-287 (1 June 1966). A clear hologram of good intensity was obtained, and it was stable, without further processing, to subsequent overall illumination by the same laser.

EXAMPLE XXXVIII

The photosensitive film and the krypton laser of Example XXXVI were used to make a hologram of the real image reconstructed by the krypton laser from a previously prepared silver halide hologram, using well-known techniques of real-image or focussed-image holography, as described, for example, by Gerald B. Brandt, "Techniques and Applications of Holography," *Electro-Technology*, Vol. 81, No. 4, 53-72 (April, 1968). Exposure was for 30 minutes with the krypton laser operating at an output of 50 mW at 476.5 nm. The hologram produced in the photopolymerizable layer of the photosensitive film was of good intensity and clarity and was stable, without further processing, to subsequent non-imagewise exposure to the same laser illumination when used for reconstructing and viewing the hologram.

EXAMPLE XXXIX

This example illustrates the use of photopolymerizable materials, laser illumination, and holographic techniques to record interference patterns that are essentially holograms of a point source. When viewed by reconstructing illumination, the recorded patterns have characteristics similar to conventional interference gratings and can be used as such. Thus, one embodiment of the invention provides a quick, simple, low-cost method of making precision interference plates.

In this work, the photosensitive film, the krypton laser, and the general procedure of Example XXXVI were used except that no object was in place to reflect light to the photosensitive film. Instead, the laser beam was spread by an appropriate lens so as to illuminate an area about 3 cm in diameter. Part of this beam illuminated the photosensitive film directly while part of the beam was reflected to the photosensitive film from a mirror. In a series of experiments, interference patterns from 200 to 2,000 l/mm were recorded on different samples of the photosensitive film. Pattern frequency was controlled according to known interference principles (see, for example, pp. 479-490 of W. H. Furry, E. M. Purcell and J. C. Street, "Physics," Blakiston Co., New York, 1952) by adjusting the light source and the mirror so that the two beams struck the photosensitive film from equal but opposite angles. Under these conditions, the frequency of the interference pattern is given by $(2 \sin \theta/\lambda)$, where $\lambda$ is the wavelength of the light used and $\theta$ is the angle the beams make with the normal to the photosensitive film. The gratings obtained in the manner described were of good clarity and intensity and were stable without any processing after the single step of exposure.

EXAMPLE XL

A photopolymerizable composition was made up as in Example XXII except that the stannous chloride dihydrate was omitted. The composition was coated on the polyethylene terephthalate clear support film of Example I, and the dried coating covered with the cover film of Example I. The photosensitive film thus prepared was placed in a vacuum frame in intimate contact with a conventional silver halide grating film containing gratings with frequencies of 500, 1,000, 1,250, 1,500 l/mm and higher, then exposed for 25 minutes at a distance of 50 cm from a 200-watt high-pressure mercury arc light. By the single step of exposure without further processing, good, light-stable copies of the original gratings at least up to 1,500 l/mm were produced. Thus, in another embodiment, the invention provides low cost copies of precision gratings.

This invention covers broadly the use of photopolymerizable compositions to make hologram originals or copies. Such compositions have the advantage that a single photon of the actinic radiation to which the composition is exposed can cause the formation of a large number of new chemical bonds through polymerization, thus giving radiation-sensitive elements which are generally of useful photographic speed. In addition, the monomer used often serves as a plasticizer for the unexposed composition, with the result that convenient operating temperatures are readily obtained, although inert plasticizers may be used if desired to adjust operating temperature. Moreover, the photopolymerizable compositions useful in the practice of this invention are readily formulated from commercially available materials, and they are relatively inexpensive. In addition, the use of photopolymerizable compositions for holograms permits the recording of very high spatial frequencies free of any limitation of particle size, since the photosensitive compositions used need not contain any particulate material.

A particularly noteworthy aspect of the present invention is the immediate availability of the hologram. The process of the invention is a one-step process, wherein the step of exposure alone produces a useful and stable finished hologram. No additional process steps are required to develop and fix the image. The useful image produced by the exposure step is not impaired by subsequent non-imagewise exposure of the copy; on the contrary, in some instances such post-exposure may in fact enhance the quality of the image, although such post-exposure is not an essential step in the process of the invention. The invention is also useful for the production of either original or copy precision gratings at substantially lower cost than heretofore possible and with immediate access to the stable product of the single step of exposure.

The embodiments of the invention in which an exclusive property or privilege is claimed are defined as follows:

1. An image-bearing layer of essentially uniform optical density containing an image stable to actinic radiation, said image-bearing layer being characterized by consisting of image and non-image areas that together constitute a holographic record in the form of organic compounds, and at least the image areas comprising a vinyl polymer, formed by addition polymerization.

2. A layer according to claim 1 which is a self-supporting layer.

3. A layer according to claim 1 on a flexible support that is transparent to visible radiation.

4. A layer according to claim 1 wherein said image areas are photopolymerized image areas.

5. A layer according to claim 1 wherein the hologram represents a diffraction grating.

6. A single step process for forming a light-stable hologram which comprises exposing to modulated actinic radiation bearing holographic information, a photopolymerizable layer, said layer comprising:
   1. at least one addition-polymerizable, nongaseous, ethylenically unsaturated monomeric compound having a boiling point above 100° C. at normal atmospheric pressure and being capable of forming a high polymer by free-radical-initiated, chain-propagating addition polymerization; and
   2. a free-radical-generating polymerization initiator or system activatable by said actinic radiation.

7. A process according to claim 6 wherein the modulated actinic radiation is applied intermittently.

8. A process according to claim 6 wherein the modulated actinic radiation is applied continuously.

9. A process according to claim 6 wherein said information represents a diffraction grating.

10. A process according to claim 6 wherein at least one free-radical-generating addition polymerization initiator is present.

11. A process according to claim 6 wherein said monomeric compound is a polyethylene glycol diacrylate or methacrylate.

12. A process according to claim 6 wherein said layer is on a dimensionally stable polyester support that transmits visible radiation.

13. A process according to claim 6 wherein said layer contains 3. a macromolecular organic polymer binder that is solid at 50° C. at normal atmospheric pressure and compatible with said monomer.

14. A process according to claim 13 wherein component (1) is present in an amount of 10 to 90 parts, component (3) is present in an amount of 10 to 90 parts, and component (2) is present in an amount of 0.001 to 10 parts per part of component (1), said parts being by weight.

15. A process according to claim 13 wherein said initiator is a polynuclear quinone.

16. A process according to claim 13 wherein the initiator system embodies a 2,4,5-triarylimidazolyl dimer consisting of two lophine radicals bound by a single co-valent bond and a leuco dye.

17. A process according to claim 13 wherein component (3) is cellulose acetate butyrate.

18. A process for forming a light-stable copy of a hologram master which comprises exposing to actinic radiation through said master a photopolymerizable layer, said layer comprising 1. at least one addition-polymerizable, non-gaseous, ethylenically unsaturated monomeric compound having a boiling point above 100° C. at normal atmospheric pressure and being capable of forming a high polymer by free-radical-initiated, chain-propagating addition polymerization; and 2. a free-radical-generating addition polymerization initiator or system activatable by said actinic radiation, to form a light-stable polymer image.

* * * * *